Sept. 9, 1969  R. LEIDENFROST  3,465,425
PROCESS FOR THE MANUFACTURE OF GAP OR LABYRINTH SEALS
Filed July 22, 1966  3 Sheets-Sheet 1

Inventor:
REINHOLD LEIDENFROST
BY
Hammond and Littell
ATTORNEYS

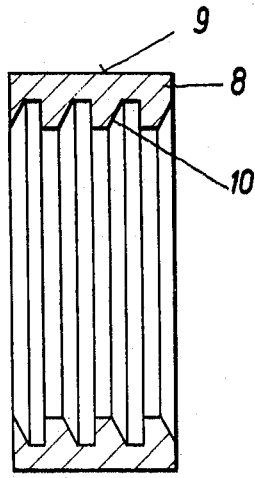
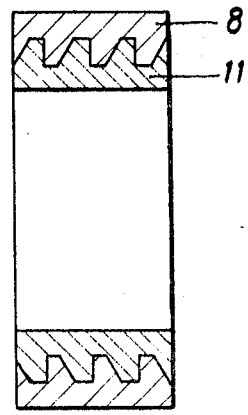
Fig. 5          Fig. 6
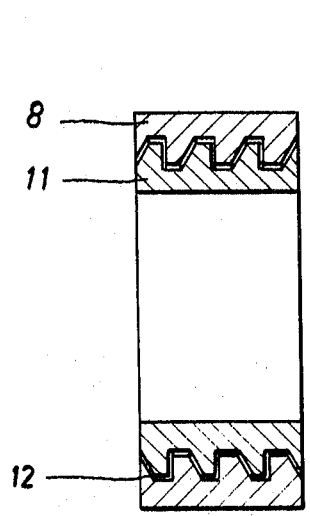
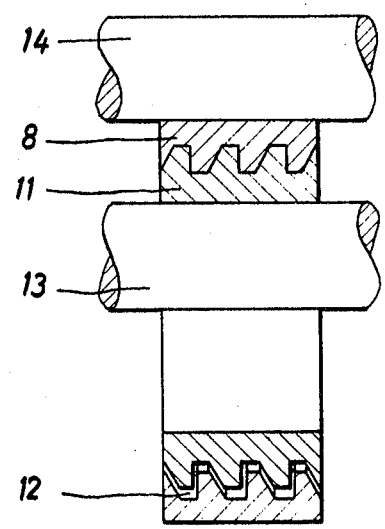
Fig. 7          Fig. 8

Sept. 9, 1969 R. LEIDENFROST 3,465,425
PROCESS FOR THE MANUFACTURE OF GAP OR LABYRINTH SEALS
Filed July 22, 1966 3 Sheets-Sheet 3

Inventor:
REINHOLD LEIDENFROST
BY
Hammond and Littell
ATTORNEYS

United States Patent Office 3,465,425
Patented Sept. 9, 1969

3,465,425
PROCESS FOR THE MANUFACTURE OF GAP OR LABYRINTH SEALS
Reinhold Leidenfrost, 101 Birkenstrasse, 8501 Feucht, near Nuremberg, Germany
Filed July 22, 1966, Ser. No. 567,235
Claims priority, application Germany, July 23, 1965, L 51,210; Mar. 11, 1966, L 53,081
Int. Cl. B23p 25/00, 9/00
U.S. Cl. 29—527.7                                    8 Claims

ABSTRACT OF THE DISCLOSURE

The present invention relates to a process for the manufacture of a contact-free gap or labyrinth seal, consisting of an outer and an inner ring with a sealing gap enclosed between them. It is immaterial if this gap is of a straight form or if it is in an already known form, for example, sawtooth profile. The invention also relates to a contact-free gap or labyrinth seal consisting of a one-piece, outer ring and a one-piece inner ring having a sealing gap enclosed between said rings.

CLAIM FOR PRIORITY

Priority of this application is claimed under 35 S.S.C. 119, based on German patent application Nos. L 51,201, filed July 23, 1965 and L 53,081 filed Mar. 11, 1966.

PRIOR ART

Gap or labyrinth seals are already known. Moreover, it is known that they have the essential advantage, compared with gliding or sliding seals, of bringing about a contact free sealing. Since friction is absent in these seals and since, consequently, they are not subjected to the usual wear, they can be utilized as seals in revolving equipment at the highest rate of revolutions, for which other types of seals are not suitable at all.

An essential requirement, which the production of those gap or labyrinth seals has to meet, consists in producing the two parts, rotating relatively towards each other and defining the sealing gap, with such high degree of accuracy that the smallest possible gap is obtained. In the customary method of their manufacture by the prior art by machining, this demand for accuracy involves considerable expense.

If in these seals, the gap is profile shaped, the installation of the seal requires that the outer ring be constructed in two parts. This division of the outer ring not only results in still higher production costs, but, at the same time, the accuracy is frequently lessened. This is due to the fact that the fitting of the outer ring into the housing bore, the danger exists that the two halves of the outer ring may shift in a slightly opposite axial direction. Furthermore, this type of an outer ring constructed in two parts has the disadvantage that the two halves of this outer ring have to be again united into one integral part by means of appropriate connecting elements if the construction of a finished, installation-ready sealing unit suitable for storage and shipping is desired.

OBJECTS OF THE INVENTION

An object of the present invention is the development of a contact-free seal consisting of a one-piece outer ring and a one-piece inner ring, said rings having common abutting profiles separated by a sealing gap.

Another object of the present invention is the development of a process for the production of a contact-free seal consisting of a one-piece outer ring and a one-piece inner ring, said rings having common abutting profiles separated by a sealing gap which comprises the steps of processing one of said rings to prepare its longitudinal profile as a common abutting profile, forming the second of said rings by applying a material on the prepared common abutting profile, and altering the radial dimension of at least one of said rings whereby a gap is formed between said two rings along said common abutting profile.

These and other objects of the invention will become apparent as the description thereof proceeds.

FIGURES 5, 6 and 8 show a different process of manufacture according to the invention in separate process steps.

FIGURE 7 is a cross-section of one embodiment of the contact-free gap or labyrinth seal of the invention.

Figure 1:
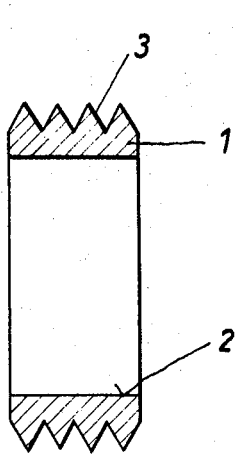
FIGURES 1 to 4 show a process of manufacture according to the invention in separate process steps.

Since the objective of the present development of the art is steady acceleration in production rates and subsequently an increase in the speed of rotation of machines, the utilization of those contact-free seals would be most desirable. The reason that this has not been the case to any extent until recently is due to the disadvantages of the difficulties of production and the resultant high production cost. Therefore, the object of the invention is to develop a process for the production of such a contact-free gap or labyrinth seal, which would render it possible to manufacture in the technically simplest way gap seals which, in spite of the low manufacturing cost, show a degree of accuracy as it could be attained until now only with considerable effort and expense.

According to the invention, this is achieved in that starting with a ring completely finished in its longitudinal section profile, material is applied onto its outer or inner surface, thus forming the second ring which abuts closely against the first ring, and then due to the subsequent expansion of the outer ring and/or the shrinkage of the inner ring, the sealing gap is obtained.

In other words, employing this process, first of all the one ring is produced for example by means of machining or by any other suitable method of manufacture. If this ring is provided with a profile on its surface facing the gap, it is not necessary that this profile be formed with specific accuracy. The form of the profile itself can vary within broad limits as long as care is taken that this profiled surface has an exact round contour with respect to the other surface. Moreover, care should be taken that the ring is as smooth as posible on its surface facing the gap in peripheral direction, whereas any unevenness in the longitudinal direction of the ring, as for instance, in the turning grooves, will not cause any interference but may even in certain cases improve the sealing action.

By subsequently applying material onto the one profiled surface of the first ring, the second ring is obtained which, due to the fact that the material applied penetrates into all of the recesses of the profiled surface of the first ring, obtains a surface which represents completely and in all details the negative of the profiled surface of the first ring. From this fact it can be concluded that any unevenness in the profile of the first ring is absolutely insignificant.

In the following process step by expanding the outer ring and/or by shrinking the inner ring, the required gap is finally obtained. It follows therefrom that it is possible by means of this method to vary the width of the sealing gap to a great extent. According to the extent to which this expansion and/or the shrinkage of one or the other ring is effected, sealing gaps of quite variable widths can be produced.

According to another embodiment advanced by the invention, material easier to deform than that used for the first ring is cast, extruded or sintered onto the outer profiled surface of the inner ring first produced. After the second ring is formed in this manner, then according to the invention both rings can be subjected to a rolling process, the outer ring, consisting of an easier deformable material, being enlarged so that a sealing gap results between the two rings. The width of the resulting gap depends entirely on the duration of this rolling process or the pressure under which the rollers are applied. In this way, the individual manufacturer can provide the gap with any width desired.

A still different process of the invention furnishes the same result when, to form the second inner ring, working material with a higher coefficient of thermal expansion is injected or extruded into the profiled inner surface of a first outer ring, produced by any optional method. A gap will result between the two rings during the cooling of this material due to the shrinkage. The width of the resultant gap can be determined by the selection of a suitable material used for the second ring.

If by this method the gap obtained is too narrow, then it also is possible according to a further embodiment of the invention, to enlarge the sealing gap by subsequent expansion of the outer ring, following the shrinkage of the inner ring such as outlined above.

The technical progress obtainable by the gap seal of the invention is quite obvious. The gap seal produced as an inseparable constructional unit can be disposed in the simplest manner possible in a smooth bore of a housing and on a smooth shaft. Specific requirements regarding accuracy need not be observed at the production and machining of these interconnecting construction members. By means of the construction method, described in the preceding, a certain degree of accuracy in the sealing gap can be achieved, as is attainable only with far greater expense in the usual construction of contact-free gap or labyrinth seals. Finally, by the process of production as indicated automatically a sealing unit is obtained ready to be stored and shipped.

The rings can be made of any appropriate metal or plastic and the two rings can be of diverse materials as long as one material can be worked as outlined above.

The process of the production according to the invention is illustrated in the drawings disclosing several examples.

FIGURES 1 to 4 show a process of the manufacture according to the invention in separate process steps.

FIGURES 5, 6 and 8 show a different process of production according to the invention.

FIGURE 7 illustrates a cross-section of one embodiment of the contact-free gap or labyrinth seal of the invention.

Figure 9:
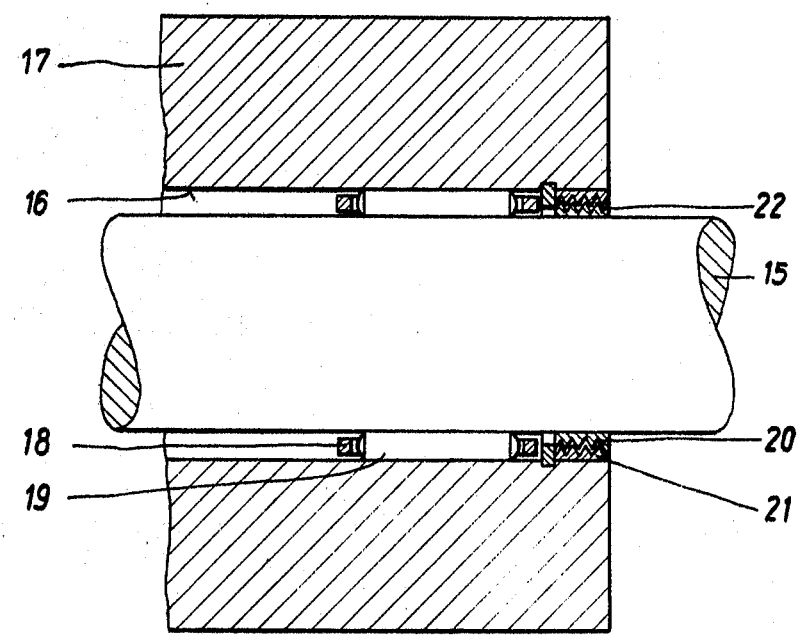
FIGURE 9 is a cross-section of the contact-free gap or labyrinth seal of the invention in use.

FIGURE 9 shows a sealing unit produced according to the invention in use.

In the process of production illustrated in FIGURES 1 to 4, in FIGURE 1, the process starts with an inner ring 1, comprising a smooth bore 2 and a sawtooth-shaped profiled outer surface 3. The said ring 1 can be manufactured by machining, sintering or other methods.

Figure 2:
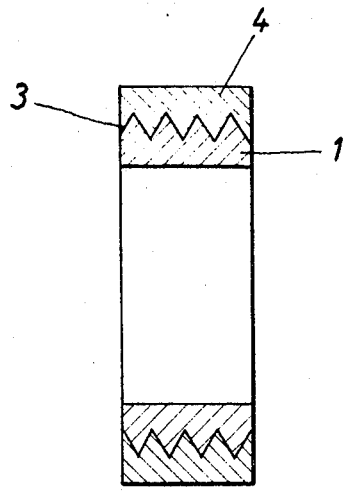

According to the invention, illustrated in FIGURE 2, the outer ring 4 is formed by applying material onto the profiled outer surface 3 of the ring 1. This application of the working material can be realized by casting, injecting, sintering of the ring 1 or by any other appropriate process. As it can be noted in FIGURE 2, the material applied fills the profiled surface 3 of the ring 1 completely.

Figure 3:
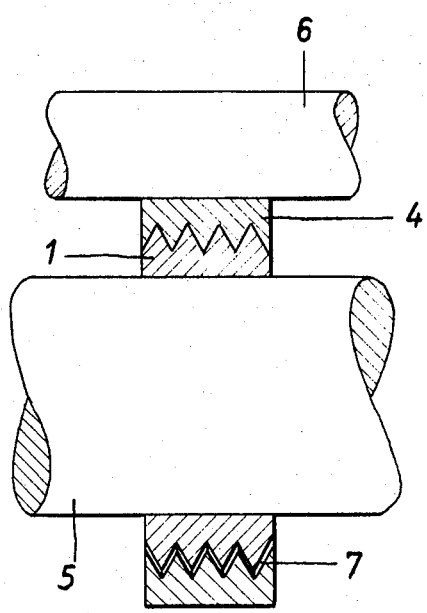
Figure 4:
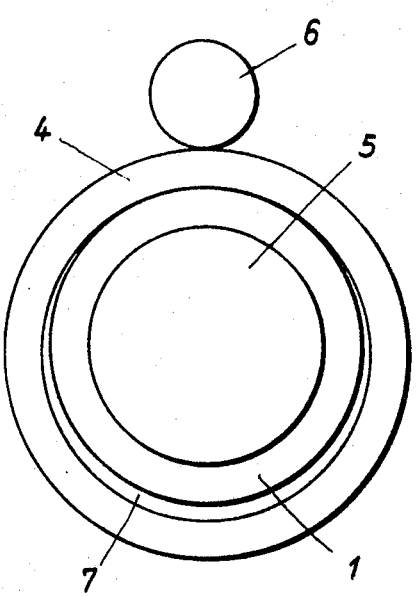

In the next process step, shown in FIGURES 3 and 4, the two rings 1 and 4, thus formed and in close abutment to each other, are subjected simultaneously to a rolling process. For this purpose, for example, a roll mandrel 5 is introduced into the bore of the ring 1, which can fill this bore completely. However, it is also possible to use a roll mandrel with a diameter smaller than that of the bore of the ring 1. The roller 6 acts under pressure on the outer ring 4. When this roller 6 rotates under pressure, the outer ring 4, consisting of a material easier to deform than that used for ring 1, is expanded, resulting in the sealing gap 7, its width determined by the duration of the rolling process and by the pressure of the rolls.

The production process illustrated in FIGURES 5, 6 and 8, according to FIGURE 5, starts with an outer ring 8 having a smooth outer surface 9 and a profiled bore 10. This ring can be produced, as the ring 1 according to any suitable method. In this embodiment type of profile of the bore of the ring 8 was chosen in a different way than indicated in the previous method. Here it should be pointed out that, when the production process of the invention is employed, practically every conceivable form of profile can be used. In the simplest case, in the present example, the ring 8 can be provided with a smooth bore which would result in a straight, cylindrical sealing gap.

According to the invention and illustrated in FIGURE 6, material is injected or extruded into the ring 8 to form the inner ring 11. During the cooling, the injected or extruded material shrinks, thus reducing the diameter of the ring 11 and resulting in the formation of the sealing gap 12 as shown in the cross-section of the finished gap or labyrinth seal in FIGURE 7. By selecting a material with a suitable coefficient of thermal expansion for the ring 11 it can be achieved that the gap obtains a sufficient width.

However, should it not be possible to obtain in this manner a sufficient width for the sealing gap 12, the rings 8 and 11 can be subjected, as described in the preceding example of process, to an additional rolling process. As shown in FIGURE 8, the rolls 13 and 14 can be employed for this purpose, one of the two rolls being disposed in the bore of the inner ring 11 and the second roll acting on the outer surface of the ring 8. The rolling process itself is the same as described in the preceding example.

FIGURE 9 illustrates in expanded cross-section an installed sealing element produced according to the process of the invention. Here, a shaft 15 is disposed in the bore 16 of the housing 17 by interposition of needle bearings 19 arranged in a cage 18. The sealing of this bearing is effected by a labyrinth seal consisting of the inner ring 20 and the outer ring 21. These two rings form a sawtooth-shaped gap 22.

The illustration shows, that with the aid of the seal according to the process of the invention it is possible to produce a perfect sealing element in this manner of installation, although the available radial width corresponds only with the diameter of the needle bearings of only a few millimeters.

The preceding description discloses specific embodiments of the invention. It is to be understood, however, that other expedients known to those skilled in the art can be employed without departing from the spirit of the invention.

I claim:

1. A method of producing a contact-free sealing element selected from the group consisting of gap seals and labyrinth seals consisting of a one-piece outer ring and a one-piece inner ring, said rings having common abutting profiles separated by a sealing gap which comprises the steps of forming one of said rings having a longitudinal profile as a common abutting profile, applying material to said longitudinal profile to form said second ring, and altering the radial dimension of at least one of said rings whereby a sealing gap is formed between said two rings along said common abutting profile.

2. The process of claim 1 wherein said common abutting profile is formed on the outer surface of an inner ring and said material is applied to said outer surface of said inner ring.

3. The process of claim 2 wherein said material applied to said outer surface of said inner ring is easier to deform than the material utilized in said inner ring and said altering of the dimension of at least one ring is effected by subjecting the rings to a rolling process whereby said outer ring formed of an easier deformable material is expanded.

4. The process of claim 1 wherein said common abutting profile is formed on the inner surface of an outer ring and said material is applied to said inner surface of said outer ring.

5. The process of claim 4 wherein said material applied to said inner surface of said outer ring has a higher thermal coefficient of expansion and is applied at an elevated temperature, whereby on cooling an altering of the dimension of the inner ring is effected.

6. The process of claim 5 wherein a further altering of the dimension of at least one of said rings is effected by a subsequent subjecting of the rings to a rolling process.

7. The process of claim 1 wherein said forming step forms one of said rings having a longitudinal profile having identations therein as a series of peaks and valleys as said common abutting profile whereby a labyrinth seal is produced.

8. The process of claim 1 wherein said forming steps forms one of said rings having a longitudinal profile having a smooth bore as said common abutting profile whereby a gap seal is produced having a straight sealing gap.

References Cited

UNITED STATES PATENTS

| | | | |
|---|---|---|---|
| 1,521,483 | 12/1924 | Stevens | 164—100 X |
| 2,027,962 | 1/1936 | Currie. | |
| 2,458,988 | 1/1949 | Gayer | 277—56 |
| 2,476,728 | 7/1949 | Heim | 29—441 X |
| 2,714,746 | 8/1955 | Meyer | 264—294 X |
| 2,781,210 | 2/1957 | Wood | 277—56 |
| 3,158,923 | 12/1964 | Reinsma. | |
| 3,264,392 | 8/1966 | Taplin | 264—294 X |
| 3,345,077 | 10/1967 | Novosad | 264—274 X |

JOHN F. CAMPBELL, Primary Examiner

D. C. REILEY, Assistant Examiner

U.S. Cl. X.R.

29—445; 72—111; 164—76; 264—242, 294; 277—56